United States Patent [19]

Yoshigai

[11] 4,444,294
[45] Apr. 24, 1984

[54] BRAKE SHOE MOUNT FOR BRAKE APPARATUS

[75] Inventor: Toshiharu Yoshigai, Higashi-Osaka, Japan

[73] Assignee: Yoshigai Kikai Kinzoku Kabushiki Kaisha, Osaka, Japan

[21] Appl. No.: 306,759

[22] Filed: Sep. 29, 1981

[30] Foreign Application Priority Data

Dec. 8, 1980 [JP] Japan ............................. 55-176551
Feb. 26, 1981 [JP] Japan ............................. 56-28288
May 13, 1981 [JP] Japan ............................. 56-70398
Jun. 3, 1981 [JP] Japan ............................. 56-82908

[51] Int. Cl.³ ............................................. B62L 1/08
[52] U.S. Cl. ................................. 188/24.11; 188/234; 403/4; 403/408
[58] Field of Search ............... 188/24.11, 24.12, 24.13, 188/24.16, 24.19, 234, 344, 361, 369, 196 M, 196 BA, 196 V; 403/408, DIG. 7, 4, 3; 271/125

[56] References Cited

U.S. PATENT DOCUMENTS

| 3,059,922 | 10/1962 | Marshall | 271/125 |
| 4,051,924 | 10/1977 | Yoshigai | 188/234 |
| 4,117,890 | 10/1978 | Youngers | 403/4 |

FOREIGN PATENT DOCUMENTS

| 1564784 | 3/1969 | France | 188/250 F |
| 727086 | 3/1955 | United Kingdom | 188/24.11 |
| 1312983 | 4/1973 | United Kingdom | |

Primary Examiner—Bruce H. Stoner, Jr.
Assistant Examiner—Robert J. Oberleitner
Attorney, Agent, or Firm—Koda and Androlia

[57] ABSTRACT

A brake shoe mount for a brake apparatus comprising a first rotatable member mounted on a brake arm and rotatable about a first axis and a second rotatable member fixedly provided with a brake shoe, mounted on the first rotatable member and rotatable about a second axis positioned away from the first axis and wherein the first rotatable member is non-rotatably fixed to the brake arm, and the second rotatable member is non-rotatably fixed to the first rotatable member.

3 Claims, 17 Drawing Figures

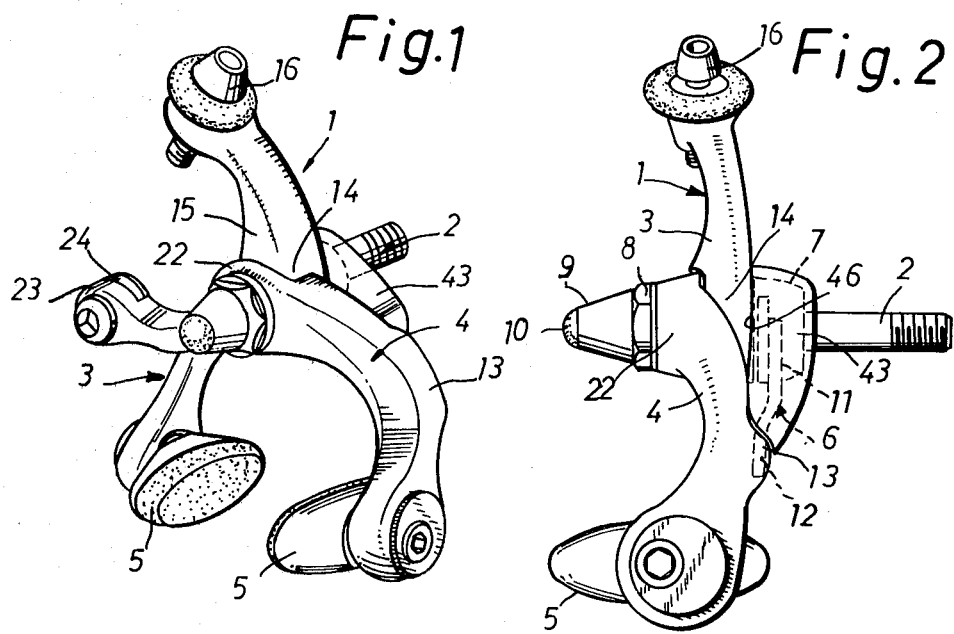
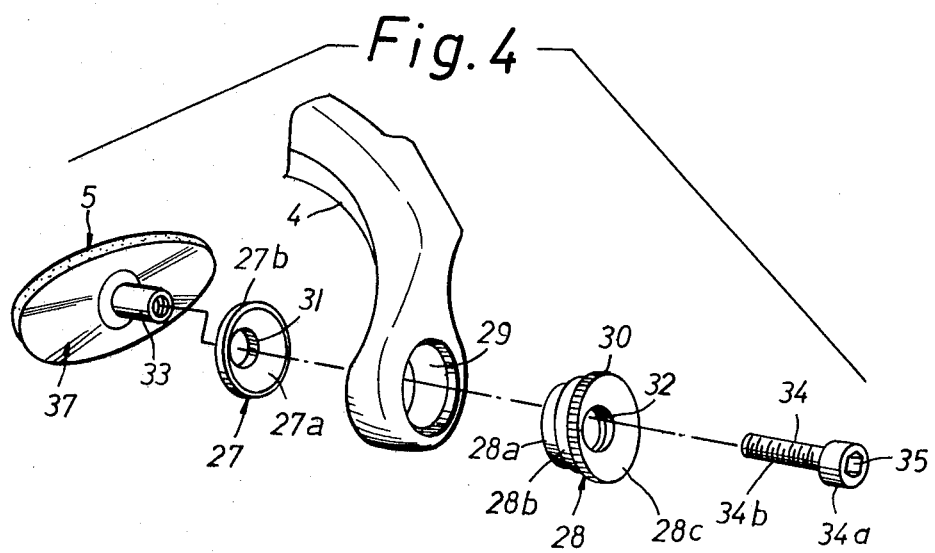

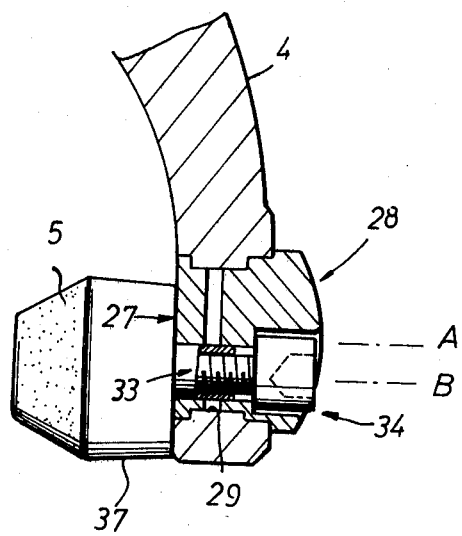
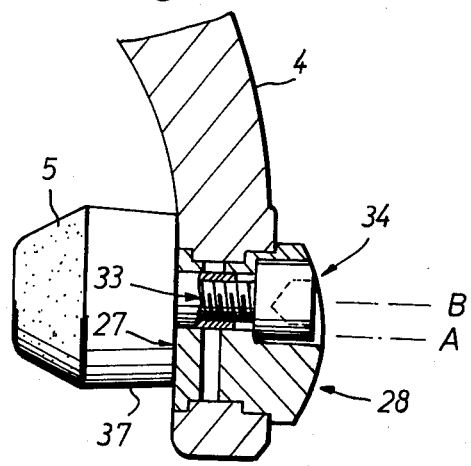
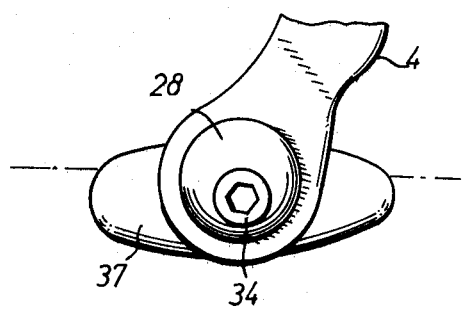
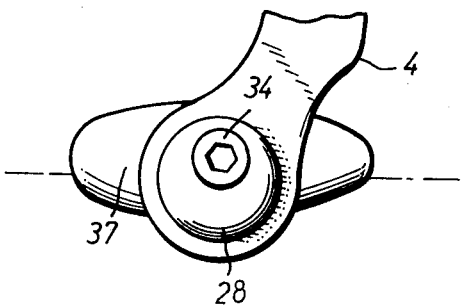
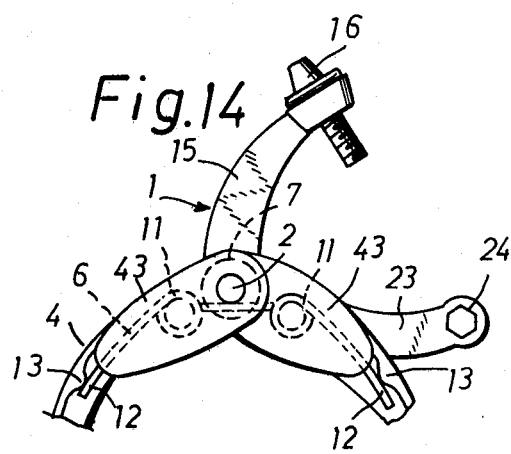
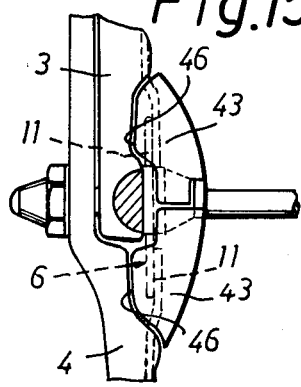

BRAKE SHOE MOUNT FOR BRAKE APPARATUS

BACKGROUND OF THE INVENTION

The present invention relates to a brake shoe mount for brake apparatus, and more particularly to a device for attaching a brake shoe to the forward end of the brake arm of brake apparatus for bicycles.

Brake apparatus widely used for bicycles include, for example, caliper brakes of the side-pull type, caliper brakes of the center-pull type, etc.

Such a brake apparatus comprises a center bolt fixed to the frame of the bicycle, a pair of brake arms supported by the center bolt and pivotally movable to bring their forward ends toward or away from each other, brake shoes attached to the forward ends of the arms and movable into or out of contact with a wheel rim of the bicycle when the arms are moved toward or away from each other, and a brake spring for biasing the arms away from each other.

The wheel of the bicycle is positioned between the pair of brake shoes. When the brake apparatus is actuated through a bowden wire, the pair of brake arms turns about the center bolt, pressing the brake shoes against the opposite sides of the wheel rim to brake the wheel.

The device for attaching the brake shoe to the forward end of the brake arm further includes adjusting means, whereby the brake shoe can be attached to the arm end in a vertically adjusted position. The brake shoe is in the form of a block of abrasion resistant rubber which is held by a holder having a bolt projecting therefrom. The forward end of the brake arm is formed with a vertically elongated bore. The bolt of the holder is inserted through the elongated bore, and a nut is screwed on the bolt to fasten the shoe to the brake arm. When the nut is loosened, the position of the shoe is adjustable vertically, i.e. radially of the wheel, within the range of the bore.

However, with the conventional device for attaching the brake shoe, the elongated bore at the forward end of the brake arm is left partly exposed even when the brake shoe is mounted in place, with the result that an air turbulence occurs at the exposed bored portion to act against the bicycle during running. This is a serious disadvantage in the case of racing bicycles in which the device must be lightweight and adapted to reduce the air resistance.

Futher when the bicycle is used on bad roads, mud or soil is likely to clog up the exposed bore portion, consequently making it impossible to vertically adjust the position of the brake shoe. The soil must then be scraped off for the adjustment of the brake shoe, hence cumbersome.

With bicycles which are used for racing on bad rods, for example, for cross-country, there arises a need to interchangeably use wheels of different diameters in accordance with the road conditions, but the brake shoe attaching device described is adapted for adjustment only in the range of the elongated bore, with the resulting likelihood that the shoe will not always be properly positionable for the rim of a replaced wheel.

SUMMARY OF THE INVENTION

An object of the present invention is to provide a mount for attaching a brake shoe to the brake arm of a brake apparatus, the mount comprising a first rotatable member mounted on the brake arm and rotatable about a first axis, a second rotatable member mounted on the first rotatable member and rotatable about a second axis in parallel to and away from the first axis, means for non-rotatably fixing the first rotatable member to the brake arm, and means for non-rotatably fixing the second rotatable member to the first rotatable member, the brake shoe being fixed to the second rotatable member.

Another object of the invention is to provide a brake shoe mount which, when a brake shoe is thereby attached to the forward end of a brake arm on a bicycle, will not produce an excessive air turbulence at the arm end to permit the bicycle to run with reduced air resistance and which is advantageously usable for racing bicycles.

Another object of the invention is to provide a brake shoe mount of the type described by which the position of the brake shoe is vertically adjustable with ease even when the brake arm end has a deposit of mud or soil and which is therefore useful for cycling on bad roads.

Still another object of the invention is to provide a brake shoe mount which is usable in combination with a conventional brake apparatus having a brake arm with an elongated bore at its forward end to render the position of the brake shoe vertically adjustable over a wider range so that the brake shoe can be properly positioned at all times for the rims of wheels having different diameters and interchangeably used for bicycles, the mount being made advantageously usable for bicycles which are used for racing on bad roads, for example, for cross country wherein the wheels must be frequently replaced by those of different diameters.

Other objects of the present invention will become apparent from the following description and the accompanying drawings.

BRIEF DESCRIPTION OF THE DRAWINGS

FIG. 1 is a perspective view showing a brake apparatus for bicycles which includes mounts of this invention;

FIG. 2 is a side elevation showing the brake apparatus;

FIG. 3 is a front view showing the brake apparatus;

FIG. 4 is an exploded perspective view on an enlarged scale showing a brake shoe mount according to a first embodiment of the invention;

FIG. 5 is an enlarged sectional view showing a brake shoe;

FIG. 6 is a view in section taken along the line VI—VI in FIG. 5;

FIG. 7 is a view in section taken along the line VII—VII in FIG. 5;

FIG. 8 is an enlarged sectional view showing the brake shoe mount;

FIG. 9 is a side elevation showing the mount with the brake shoe in the same position as in FIG. 8;

FIG. 10 is a sectional view showing the mount with the brake shoe mounted in a lowered position;

FIG. 11 is a side elevation showing the mount and corresponding to FIG. 10;

FIG. 12 is a sectional view showing the mount with the brake shoe mounted in a raised position;

FIG. 13 is a side elevation showing the mount and corresponding to FIG. 12;

FIG. 14 is a rear view showing cowlings as attached to the brake apparatus of FIGS. 1 and 2;

FIG. 15 is a plan view partly in section and showing the cowlings of FIG. 14;

FIG. 16 is a perspective view showing the cowlings; and

FIG. 17 is an enlarged sectional view showing the cowlings.

DESCRIPTION OF THE PREFERRED EMBODIMENTS

Figures 3, 5, 6, 7, 8, 9:
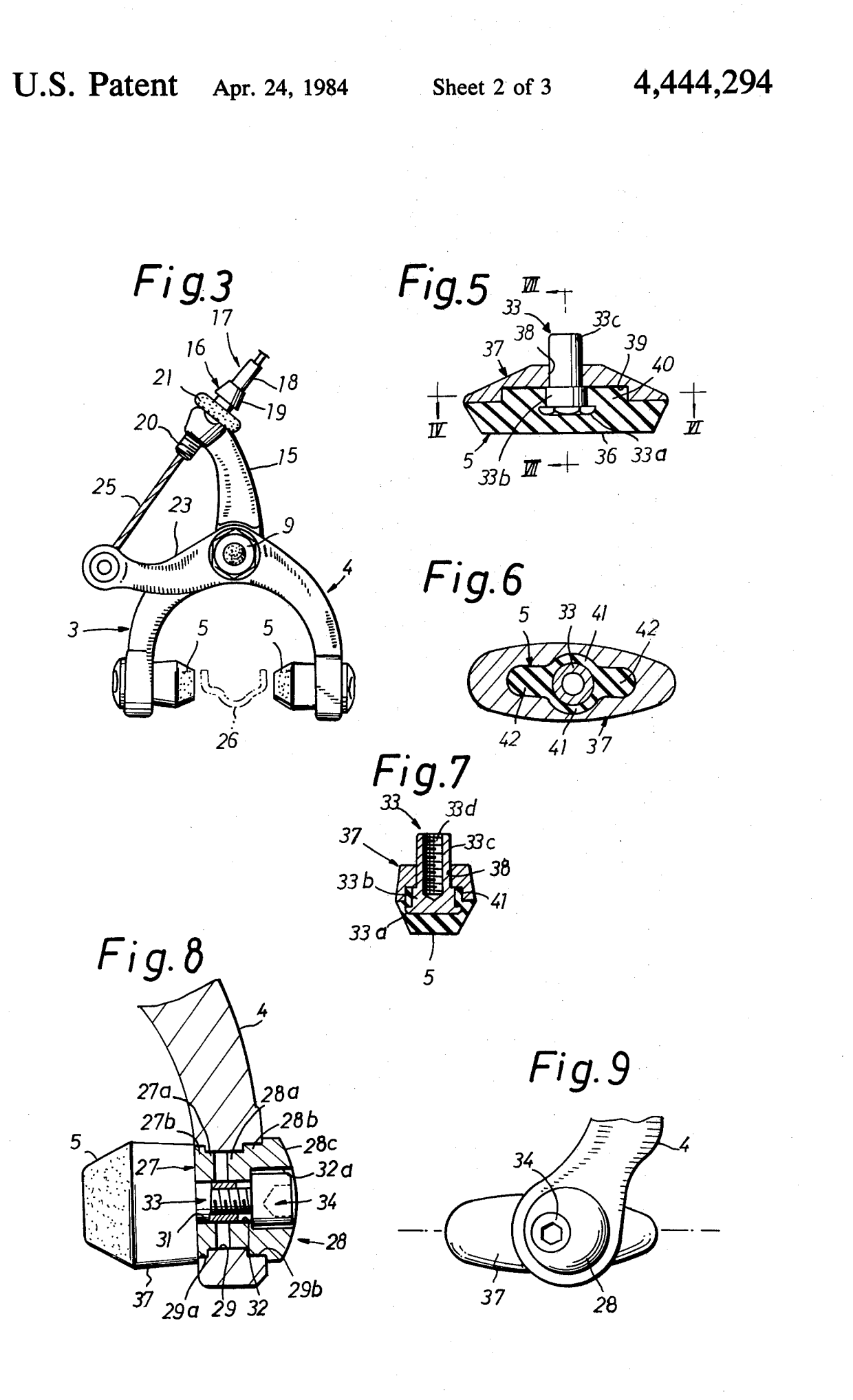

FIGS. 1 to 3 show a brake apparatus 1 embodied as a caliper brake of the side-pull type for bicycles. The brake apparatus 1 consists chiefly of a center bolt 2, a pair of first brake arm 3 and second brake arm 4 supported by the center bolt 2 and pivotally movable to bring their forward ends toward or away from each other, brake shoes 5, 5 attached to the forward ends of the arms 3, 4, and a brake spring 6 for biasing the two arms 3, 4 away from each other.

The center bolt 2 is in the form of a shaft having a threaded portion at each of its opposite ends and a flange-like spring holder 7 integrally formed at its midportion. The first and second brake arms 3, 4 are supported on the center bolt 2 in front of the spring holder 7. A lock nut 8 and a conical nut 9 are screwed on the front end threaded portion of the bolt 2. The conical nut 9 is formed in its forward end with a hexagonal bore, in which a rubber plug 10 is removably fitted. A pair of seat members (not shown) are mounted on the portion of the center bolt 2 to the rear of the spring holder 7. As already known, the rear portion of the bolt is inserted through the frame of the bicycle, and the frame is clamped between the seat members with a nut screwed on the threaded rear end of the bolt, whereby the brake apparatus 1 is rigidly fixed to the frame.

The brake spring 6, which is made of steel wire, is generally arch-shaped and includes loop portions at its opposite shoulders (see FIGS. 14 and 15). The brake spring 6 extends along the rear side of the brake arms 3, 4 and has a top portion retained in a groove of the holder 7 and opposite ends 12, 12 engaged with projections 13, 13 on the arms 3, 4 on the rear side thereof.

The first brake arm 3, which is called a small arch, includes a vertical arm portion 15 extending upward from the portion 14 thereof pivoted to the center bolt 2 and carrying a connector 16 at its top end. As seen in FIG. 3, the connector 16 has a head 19 supporting one end of the outer wire 18 of a bowden wire 17, and a shank 20 in the form of a threaded tube and inserted through the top end of the vertical arm portion 15. The connector 16 has an adjusting nut 21 positioned between the head 19 and the top arm end and screwed on the shank 20.

The second brake arm 4, which is called a large arch, includes a horizontal arm portion 23 extending sidewise from the portion 22 thereof pivoted to the center bolt 2. An inner wire connector 24 is attached to the outer end of the arm portion 23. The inner wire 25 of the bowden wire 17 extends through the connector 16 on the vertical arm portion 15 and has one end connected to the inner wire connector 24. The other end of the bowden wire 17 is connected to a brake operating lever (not shown) mounted on the handle of the bicycle.

When the brake operating lever is operated, the powden wire 17 is tensioned, moving the vertical arm portion 15 and the horizontal arm portion 23 toward each other and thereby turning the brake arms 3, 4 on the center bolt 2, whereby the brake shoes 5, 5 on the arm ends are pressed against the opposite sides of a wheel rim 26. If the bowden wire 17 is released from tension by the lever, the brake spring 6 moves the two arms 3, 4 away from each other to bring the brake shoes 5, 5 away from the wheel rim 26.

The brake shoes 5, 5 are attached to the forward ends of the first and second brake arms 3, 4 by mounts of this invention. FIGS. 4 to 13 show a first embodiment of the invention. Although these drawings show the mount on the second brake arm 4 only, the mount on the first brake arm 3 has the same construction as the illustrated one.

The brake shoe mount comprises a first rotatable member mounted on the brake arm 4 and rotatable about a first axis, a second rotatable member mounted on the first rotatable member and rotatable about a second axis parallel to and away from the first axis, means for non-rotatably fixing the first rotatable member to the brake arm 4, and means for non-rotatably fixing the second rotatable member to the first rotatable member. The brake shoe 5 is fixed to the second rotatable member.

With reference to the first embodiment shown in FIGS. 4 to 13, the first rotatable member comprises a pair of inner disk 27 and outer disk 28, which are rotatably fitted in a circular bore 29 formed in the forward end of the brake arm 4. The circular bore 29 has inner and outer openings which are referred to as large-diameter portions 29a and 29b respectively. The two disks 27, 28 are so shaped as to fit in the circular bore 29 and also in the large-diameter portions 29a, 29b respectively. The inner disk 27 has a small-diameter portion 27a and a large-diameter portion 27b. The outer disk 28 has a small-diameter portion 28a and a large-diameter portion 28b. The outer disk 28 further has a flange 28c bulging to a convex shape from the outer side surface of the brake arm 4. The flange 28c has a milled periphery as indicated at 30. Accordingly the two disks 27, 28 are rotatable about a first axis A through the center of the circular bore 29. The two disks 27, 28 are respectively formed with eccentric holes 31, 32 the center of which is away from the first axis A.

The second rotatable member comprises a screw sleeve 33 and a bolt 34 screwed therein. The screw sleeve 33 is inserted through the eccentric hole 31 of the inner disk 27 and further into the eccentric hole 32 of the outer disk 28. The bolt 34 has a head 34a formed with a hexagonal cavity 35 and an externally threaded shank 34b. The bolt 34 is inserted through the eccentric hole 32 of the outer disk 28 and has its shank 34b screwed in the screw sleeve 33. The eccentric hole 32 of the outer disk 28 has a large-diameter portion 32a for receiving the bolt head 34a therein. Accordingly the screw sleeve 33 and the bolt 34 are rotatable about a second axis B through the center of the eccentric holes 31, 32.

The screw sleeve 33 constituting the second rotatable member is fixed to the brake shoe 5 in advance. The brake shoe 5 is in the form of an abrasion resistant rubber block having a flat braking face 36 on its front side. The base end of the screw sleeve 33 is embedded in and fixed to the shoe 5 on the rear side thereof. The screw sleeve 33 has a flange-like hexagonal head 33a at its base end, a tubular body 33b integral with the head 33a and a tubular leg 33c extending from the body 33b, having a smaller diameter than the body 33b and internally threaded as at 33d. The head 33a and body 33b of the screw sleeve 33 are embedded in the rubber shoe 5 when the rubber is vulcanized. A shoe holder 37 is fixed to the rear side of the brake shoe 5. The holder 37 is made from aluminum alloy by casting or forging in the shape of a dish approximately resembling a water drop in contour and has in its center a hole 38 for inserting the screw sleeve 33 therethrough. A recess 39 is formed in the holder around the hole 38. The shoe 5 is integrally formed with a projection 40 fittable in the recess 39. The recess 39, as well as the projection 40, includes circular arc portions 41 concentric with the sleeve 33 and extensions 42 extending from the portions 41 longitudinally of the shoe. The holder 37 is fitted to the shoe 5 by the engagement of the projection 40 in the recess 39. Preferably an adhesive is applied between the holder 37 and the shoe 5 to firmly join them together.

The screw sleeve 33 and the bolt 34 constituting the second rotatable member also serve as means for non-rotatably fixing the first rotatable member to the brake arm 4 and further as means for non-rotatably fixing the second rotatable member to the first rotatable member. Stated more specifically, when the bolt 34 is tightly screwed in the sleeve 33, the inner disk 27 and the outer disk 28 providing the first rotatable member are drawn toward each other to firmly clamp the brake arm 4 at the circular bored portion 29, whereby the first member is held against rotation. At the same time, the bolt head 34a in the large-diameter portion 32a of the eccentric hole 32 of the outer disk 28 is pressed against the disk 28, and the shoe holder 37 is pressed against the inner disk 27, with the result that the screw sleeve 33 and the bolt 34 constituting the second rotatable member become non-rotatable relative to the disks 27, 28.

On the other hand, when the bolt 34 is loosened from the sleeve 33, the pair of disks 27, 28 is rotatable within the circular bore 29 about the first axis A, while at the same time the sleeve 33 and the bolt 34 are rotatable within the eccentric holes 31, 32 about the second axis B.

In this way, the brake shoe 5 is freely adjustable to high, medium and low positions as mounted on the brake arm 4 as shown in FIGS. 8 to 13. FIGS. 8 and 9 show the brake shoe in its intermediate mounted position, FIGS. 10 and 11 show the shoe in its low mounted position, and FIGS. 12 and 13 show the shoe in its high mounted position. The position of the brake shoe 5 is adjustable to the desired level by rotating the pair of disks 27, 28 about the first axis A within the circular bore 29 after loosening the bolt 34 from the screw sleeve 33, then turning the sleeve 33 and the bolt 34 about the second axis B within the eccentric holes 31, 32 to position the shoe 5 in an approximately horizontal position alongside the wheel rim 26, and thereafter firmly screwing the bolt 34 into the sleeve 33.

The brake apparatus incorporating the brake shoe mount according to the first embodiment of the invention achieves good results when used for racing bicycles. The circular bore 29 at the forward end of the brake arm 4 is completely closed with the pair of disks 27, 28. The pair of brake arms 3, 4 and the pair of brake shoes 5, 5 including the shoe holders 37, 37 are all streamlined. These features permit the bicycle to run advantageously at a high speed with reduced air resistance. To achieve still improved results, the pair of brake arms 3, 4 are provided with cowlings 43, 43 on the rear side thereof as seen in FIGS. 1 and 2. Each of the cowling is integrally molded from plastics in the shape shown in FIGS. 14 to 17. The cowling 43 is rotatably supported by the center bolt 2 inserted through a hole 44 and has a recess 45 for accommodating the loop portion 11 of the brake spring 6 and a side wall 46 for covering the spring holder 7 and the brake spring 6.

What is claimed is:

1. A brake shoe mount for a brake apparatus having a pair of brake arms for attaching a brake shoe to a forward end of each of the brake arms, the mount comprising:

a pair of disks inserted in a circular bore formed through the forward end of the brake arm, said circular bore having a first axis through its center and having large-diameter portions at its inner and outer openings respectively, the disks being so shaped as to fit in the circular bore as well as the large-diameter portions, whereby the disks are adapted to rotate about the first axis in the bore;

a shoe holder having the brake shoe fixed thereto and having a first screw member projecting from its rear side, said first screw member being inserted into eccentric holes formed through the pair of disks, said eccentric holes having a second axis through their centers which is in parallel to and away from the first axis, whereby the first screw member is adapted to rotate about the second axis in the eccentric holes;

a second screw member which is in screw-thread engagement with said first screw member, whereby when the two screw members are tightened, the disks are non-rotatably fixed to the brake arm in clamping engagement with the portion between the large-diameter portions while causing the shoe holder to be non-rotatably fixed to the inner disk in pressing contact therewith.

2. A brake shoe mount as defined in claim 1 wherein the first and second screw members comprise a screw sleeve and a bolt respectively, said bolt having a head formed with a hexagonal cavity and an externally threaded shank, the eccentric hole of the outer disk has a large-diameter portion for receiving the bolt head therein.

3. The brake shoe mount as defined in claim 1 or 2 wherein the outer disk has a flange bulging to a convex shape from the outer side surface of the brake arm, said flange having a milled periphery.

* * * * *